United States Patent [19]

Sifford et al.

[11] 4,270,179

[45] May 26, 1981

[54] COMPLEX TERNARY CORRELATOR AND METHOD FOR ADAPTIVE GRADIENT COMPUTATION

[75] Inventors: Bruce M. Sifford, Los Altos; D. Thomas Magill, Palo Alto, both of Calif.

[73] Assignee: Ricoh Company, Ltd., Tokyo, Japan

[21] Appl. No.: 53,226

[22] Filed: Jun. 29, 1979

[51] Int. Cl.³ .................. G06F 15/31; G06F 15/336
[52] U.S. Cl. .................................... 364/724; 364/728
[58] Field of Search .............. 364/715, 724, 728, 736, 364/754, 819, 824; 333/18, 28 R

[56] References Cited

U.S. PATENT DOCUMENTS 3,548,383  12/1970  Blitz et al. ........................ 364/728
3,926,367  12/1975  Bond et al. ...................... 364/754 X Primary Examiner—Jerry Smith
Attorney, Agent, or Firm—Claude A. S. Hamrick

[57] ABSTRACT

A complex ternary correlator and method for adaptive gradient computation in an adaptive equalizer and including four ternary operation circuits, four ternary multiplier circuits for obtaining the cross products of the ternary operation outputs, a subtractor circuit for developing a signal commensurate with the difference between two of the ternary multiplier outputs, an adder circuit for developing a signal commensurate with the sum of the remaining two ternary multiplier outputs and two identical integrating circuits for obtaining the real and imaginary adaptive tap coefficient update increments in an adaptive equalizer.

10 Claims, 3 Drawing Figures

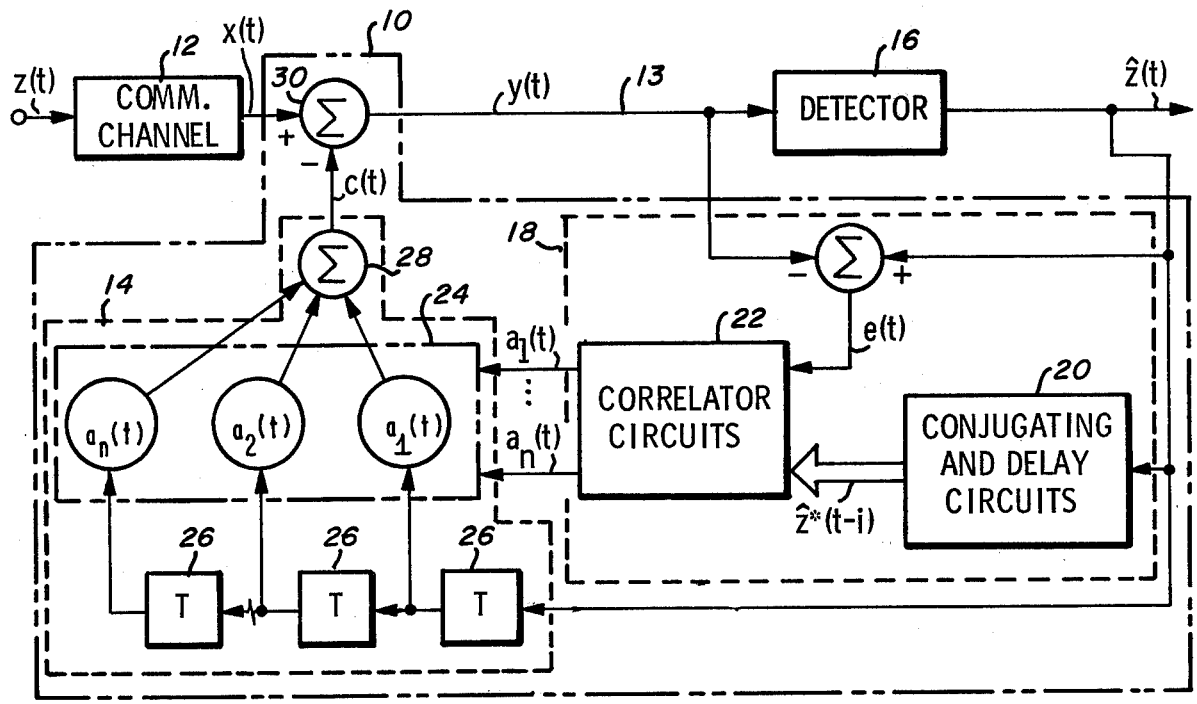
Fig_1 PRIOR ART
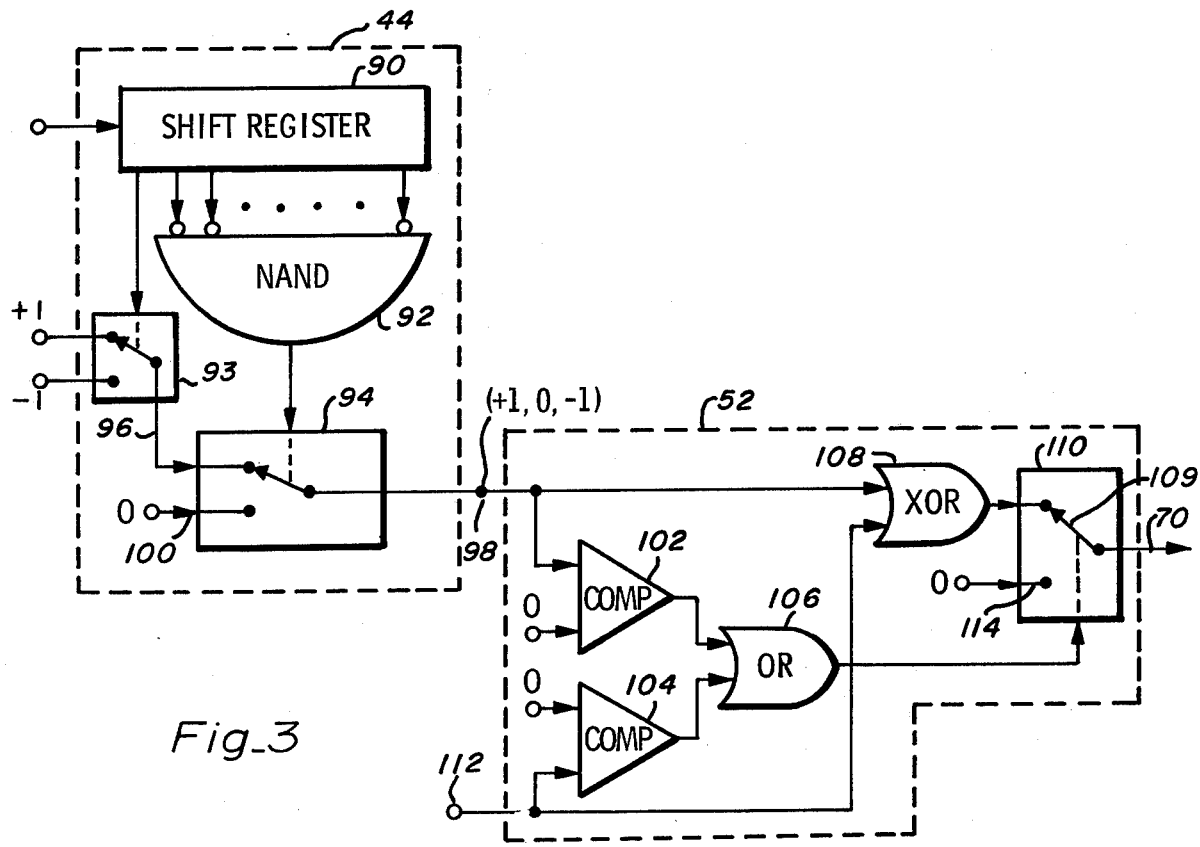
Fig_3

COMPLEX TERNARY CORRELATOR AND METHOD FOR ADAPTIVE GRADIENT COMPUTATION

BACKGROUND OF THE INVENTION

1. Field of the Invention

The present invention relates generally to communications signal handling methods and apparatus and more particularly to a complex ternary correlator method and apparatus for use in developing the tap coefficient update increments in an adaptive equalizer.

2. Description of the Prior Art

A typical prior art communication system adaptive equalizer is illustrated generally at 10 in FIG. 1 and has as its functional objective the restoration of channel distorted data x(t) to a very close approximation y(t) of the originally transmitted data z(t) which is then input to a detector 16. FIG. 1 illustrates a decision feedback equalizer, but similar correlation and gradient computation is required for feedforward or hybrid feedforward-/feedback equalizers. The feedback equalizer is comprised of three principal components: a transversal filter portion 14 which linearly processes prior detected symbols $\hat{z}(t)$; a gradient computation portion 18 which adjusts the tap coefficients 24 of the transversal filter; and a detector (or decision) portion 16 which identifies an input signal as one of a predetermined set of signals. An example of one such detector is the V.29 constellation detector disclosed in the copending application of Bruce M. Sifford, Ser. No. 960,851, filed Nov. 15, 1978.

Adaptive equalizers of the type illustrated at 10 in FIG. 1 of the drawing have their tap coefficients 24 adaptively adjusted on the basis of the pseudo-error signal e(t) which is generated by subtracting the equalized data y(t) from the complex data output $\hat{z}(t)$. Ideally, this error signal would be generated by comparing the equalizer output y(t) with the true data z(t). However, for practical communication systems this is impossible, and the pseudo-error signal e(t) is formed using the data detector output $\hat{z}(t)$ instead of z(t). Under normal circumstances this is acceptable since z(t) and $\hat{z}(t)$ almost always agree.

The decision feedback equalizer of a typical receiver system exploits the fact that at the output of the communication channel 12 there is residual intersymbol interference from previous symbols transmitted. Assuming that correct decisions have already been made on these past symbols, the late-arriving contributions can then be subtracted from the current-received signal x(t). The mechanism for accomplishing this is to excite a complex tapped-delay-line filter with the complex decision signals that have been made and then subtract the weighted filter tap outputs from the incoming complex signal. The taps are continuously adjusted to minimize the average error signal e(t) produced at the receiver output.

The tap coefficients may be updated at each sampling instant, and each new tap coefficient is the old value plus a new increment (which might be 0); that is, $$a_i(t+1) = a_i(t) + \Delta a_i(t+1) \tag{1}$$

for i = 1 to n where n is the number of taps.

The increment is calculated on the basis of the adaptive gradient algorithm $$a(t+1) = a(t) + k \cdot e(t) \cdot \hat{z}^*(t-1) \tag{2}$$

where
- a(t), e(t) and $\hat{z}(t)$ are complex-valued functions,
- e(t) is the complex pseudo-error signal,
- $\hat{z}(t)$ is the complex detector output,
- k is a scaling factor, and
- the * denotes complex conjugate.

It may thus be shown that the gradient is proportional to the cross correlation between the pseudo-error and the detector output data, i.e., $\overline{e(t)\hat{z}(t-i)}$, where the superbar denotes an averaging process that is performed by the above equation (1). The new increment, $\Delta a_i$, is then based directly on this cross correlation. This approach is generally referred to as an analog correlator method even though in this disclosure it is implemented in an integer, fixed-word-length realization.

The disadvantage of this "analog" correlator method is that it requires one p-bit (typically p=8) multiplier for each of the n taps of the transversal filter. Since n is frequently greater than 16, and may be as high as 64, this is a very costly requirement. The purpose of this invention is to substantially reduce the complexity of these correlators.

SUMMARY OF THE INVENTION

It is therefore a principal object of the present invention to provide a relatively simple signal correlation method and apparatus for computing adjustments to be made to the taps of an adaptive feedback equalizer.

Another object of the present invention is to provide a correlation means as described above which does not require expensive multiple-bit digital multiplication components.

Still another object of the present invention is to provide a correlation means of the type described which is substantially faster in operation than prior art correlation devices and therefore decreases the computational load.

Briefly, a preferred embodiment of the present invention in which it is assumed that the complex equalizer inputs $\hat{z}$ and e are represented by p-bit real and imaginary components includes four ternary operation circuits, four ternary multiplier circuits for obtaining the cross products of the ternary operation outputs, a subtractor circuit for developing a signal commensurate with the difference between two of the ternary multiplier outputs, an adder circuit for developing a signal commensurate with the sum of the remaining two ternary multiplier outputs and two identical integrating circuits for obtaining the real and imaginary adaptive tap coefficients.

An important advantage of the present invention is that it enables equalizer update increments to be obtained much faster and at substantially less cost than was the case using prior art techniques.

These and other objects and advantages of the present invention will no doubt become apparent to those of ordinary skill in the art after having read the following detailed description of the preferred embodiment which is illustrated in the several figures of the drawing.

IN THE DRAWING

FIG. 1 is a diagram schematically illustrating an adaptive equalizer system including complex ternary correlator circuits in accordance with the present invention;

FIG. 3 is a diagram schematically illustrating the ternary operators and ternary multipliers shown in FIG. 2.

DETAILED DESCRIPTION OF THE PREFERRED EMBODIMENT

Figure 2:
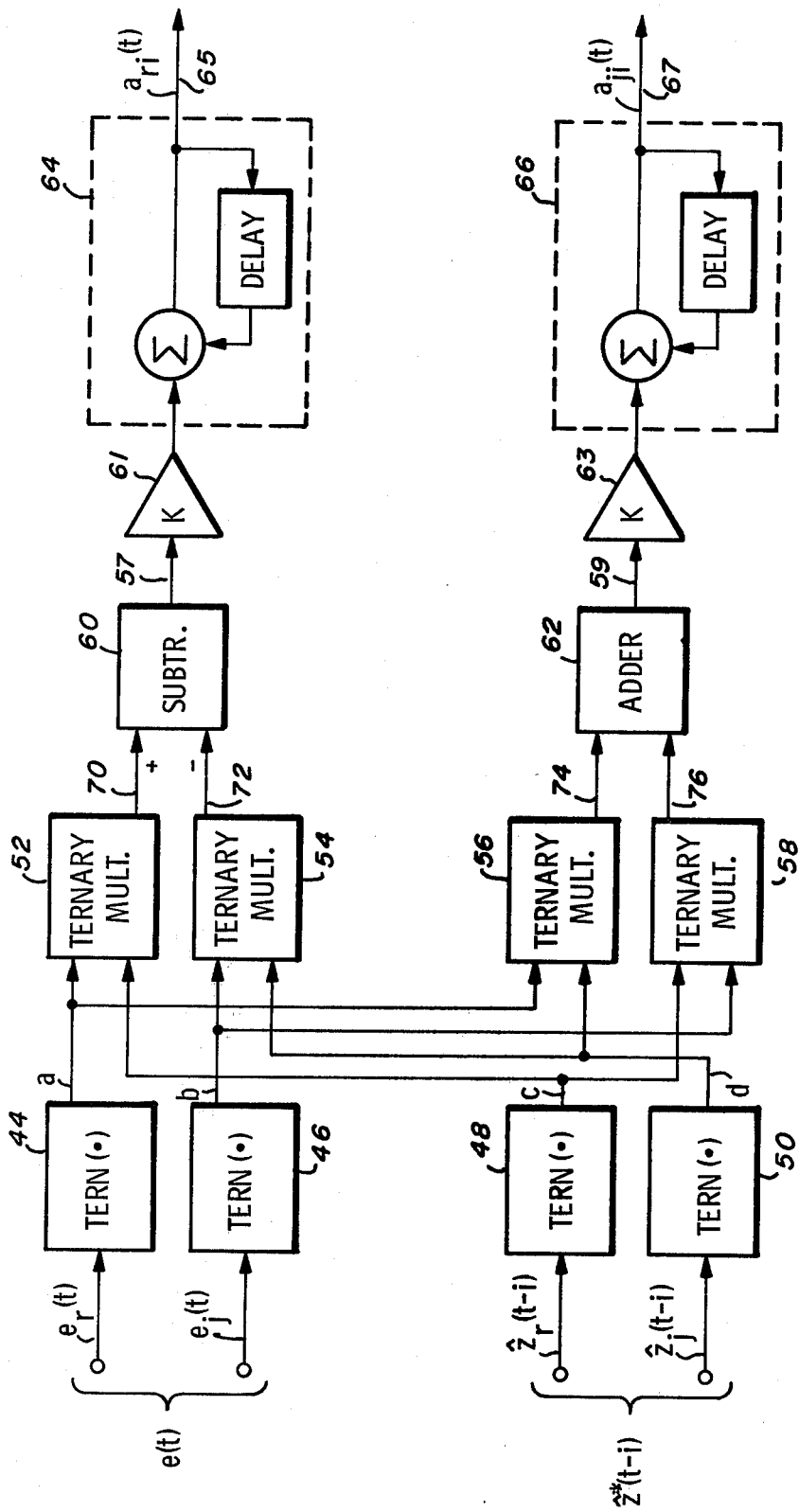
FIG. 2 is a block diagram illustrating the principal operative components of a ternary correlator in accordance with the present invention.

Referring now again to FIG. 1 of the drawing, it will be noted that in order to perform in accordance with the decision feedback algorithm of equation (2) above, the gradient computation portion 18 must have conjugating and delay circuits 20 for developing the appropriate conjugates of $\hat{z}(t)$, and correlator circuits 22 for correlating e(t) with the conjugates to develop the complex update increments $\Delta a_i(t)$ for adjusting respective tap values 24 of the delay line 26. In the typical case, e(t) and $\hat{z}(t)$ are 8-bit digital words where one of the bits is a sign bit.

The present invention provides a novel ternary correlator method and circuitry which substantially decreases the computational load as compared to prior art methods and apparatus. The ternary correlator method may be best understood as an extension of the binary or polarity correlator method.

The polarity correlator concept is that a real 8-bit-by-8-bit multiplication of R and S is replaced by a simple exclusive OR operation on the sign of R and the sign of S. In effect, the 8-bit multiplication is replaced by a 1-bit multiplication which is much simpler.

These statements are true, assuming that R and S are available in analog form such that the probability of obtaining a value of zero for either of these functions is zero. However, for the present application, R and S are digitized, and the probability of obtaining a zero value is reasonably high. Consequently, it is necessary to modify the polarity correlator to include the zero value. This modification results in what we call the ternary correlator.

As noted above, the R and S functions used in the correlation process can assume a zero value. Rather than assigning zero value a polarity, which would tend to create a bias, the signum operation is replaced with the "tern" (for ternary) operation. The tern operative (i.e., tern(R)) is equal to the sign of R unless R=0, in which case the tern (R)=0. The truth table for the ternary multiplication tern(R)·tern(S) is as follows:

TABLE 1

|       | S > 0 | S = 0 | S < 0 |
|-------|-------|-------|-------|
| R > 0 | +1    | 0     | −1    |
| R = 0 | 0     | 0     | 0     |
| R < 0 | −1    | 0     | 30 1  |

The above of course assumes that the variables are real valued. However, for most applications, they are complex valued, and it is necessary to be concerned with what is meant by the sign, or rather the tern, of the complex number. The complex tern operation can be defined as $$\text{tern}\{W\} = \text{tern}\{W_r + jW_j\} = \text{tern}\{W_r\} + j\text{tern}\{W_j\} \quad (3)$$

for any complex number W. Thus, by defining e(t) and $\hat{z}(t-i)$ in Equation 2 as $$e(t) = a + jb \quad (4)$$

and $$\hat{z}(t-i) = c + jd \quad (5)$$

and if the results of the ternary correlation multiplication operation is designated $\Delta\Psi(t)$, then $$\begin{aligned}\Delta\Psi(t) &= \text{tern}[a + jb] \cdot \text{tern}[c + jd] \\ &= [\text{terna} \cdot \text{ternc} - \text{ternb} \cdot \text{ternd}] \\ &\quad + j[\text{ternb} \cdot \text{ternc} + \text{terna} \cdot \text{ternd}].\end{aligned} \quad (6)$$

Thus, $\Delta\Psi(t)$ is a five-level complex number; that is, both the real and imaginary parts can take on values of $\pm 1$, $\pm 2$, or 0. Furthermore, note that $\Delta\Psi(t)$ differs from the ternary operation on the direct product; that is, $$\text{tern}[e \cdot \hat{z}] = \text{tern}[ac - bd] + j\text{tern}[bc + ad].$$

This latter operation comes closer to providing the true gradient. However, it requires far more computation. On the average, the two approaches should give approximately the same result, but the approach of Equation (6) has been chosen because of its computational simplicity.

The ternary correlator output $\Delta\Psi(t)$ is used to generate the tap coefficient update increment $\Delta a_i(t)$. For steady-state operation, $\Delta a_i(t)$ affects only the least significant bit of $a_i(t)$, thereby improving noise performance further. However, during acquisition, which can be sensed by the higher mean square error, a larger step size can be used to reduce the acquisition time.

Turning now to FIG. 2 of the drawing, a block diagram of a ternary correlator in accordance with the present invention is shown. The correlator includes four ternary operating circuits 44-50, four ternary multiplying circuits 52-58, a subtraction circuit 60, and an adder circuit 62. In addition, two accumulator circuits 64 and 66 are also shown for accomplishing the updating operation. Each of these accumulators is preceded by an operational amplifier of gain k representing the scaling factor of Equation (2). It will be noted that the circuit as illustrated is a direct implementation of equation (6) above. In this implementation, it is assumed that the input e(t) is available as real and imaginary components $e_r(t)$ and $e_j(t)$. The tern operator circuit 44 operates on $e_r(t)$ to develop the factor above-identified as terna, while the operator 46 operates on $e_j(t)$ to develop the above factor ternb.

Simultaneously, the tern operator 48 develops ternc from the real part of z(t−i) and the tern operator 50 develops ternd from the negative of the imaginary part of z(t−i). The ternary outputs a through d are then input to the multipliers 52-58 to develop on line 70 the product terna·ternc; to develop on line 72 the product ternb·ternd; to develop on line 74 the product terna·ternd; and to develop on line 76 the product ternb·ternc.

The signal developed on line 72 is then subtracted from that on line 70 by the subtraction circuit 60, and the signals developed on line 74 and 76 are added together by the adder circuit 62. The signal developed on lines 57 and 59 may either be used to directly generate the tap coefficient update increments or it may be compared to certain threshold levels to improve noise performance. But in either case the resulting signal developed on lines 57 and 59 are fed into the accumulators 64 and 66 to develop the real and imaginary tap coefficients $a_{ri}(t)$ and $a_{ji}(t)$.

In FIG. 3 the internal components of the tern operators and ternary multipliers are schematically illustrated for the case where the real and imaginary inputs are 8-bit binary words. More specifically, the tern operator 44 may be embodied to include an 8-bit shift register 90 for receiving seven data bits and one sign bit. From register 90 the seven data bits are input to a NAND gate 92, the output of which is normally low but goes high if all 7 magnitude bits representing zero values are shifted into register 90. The sign bit is input to a switch 93 which in response thereto selects either a +1 voltage level or a −1 voltage level for output on line 96. A switch 94 normally couples the sign bit input on line 96 to its output 98, but in the event that the output of NAND gate 92 goes high, as would be the case where each of the 7 bits in register 90 were zeros, the switch contact 95 will be moved to terminal 100 to couple a zero-voltage level to the output terminal 98. Accordingly, the output of tern operator 44 will either be a +1, a −1 or a 0.

The ternary multiplier 52 includes a pair of comparators 102 and 104, an OR gate 106, an exclusive OR gate 108, and a switch 110. It will be appreciated from the drawing that with the switch 110 normally in the position indicated, the output of gate 108 will be either a +1 or a −1, depending upon the nature of the inputs applied to terminals 98 and 112.

However, in the event that either of the comparators 102 or 104 detects a zero level appearing on either the line 98 or 112, an output will be developed for passage through OR gate 106 which will cause contactor 109 of switch 110 to contact the terminal 114 and output a zero level at terminal 70. Accordingly, the output developed at terminal 70 will be either a +1, a −1 or a 0.

Although only one ternary operator/ternary multiplier pair is illustrated in FIG. 3, it will be appreciated that the other like units are similar and function in a similar fashion.

Returning now to FIG. 2, it will be appreciated that by subtracting the output developed on line 72 from that developed on line 70, an output will be developed on line 57 which is either +2, +1, 0, −1 or −2. And by the same reasoning, the addition of the signals developed on lines 74 and 76 will also develop a similar one-out-of-five level signal on line 54.

As indicated above, the real and imaginary increments $\Delta a_{ri}(t)$ and $\Delta a_{ji}(t)$ are then fed into the accumulators 64 and 66 which form the complex tap coefficient $a_i(t)$.

Although the present invention has been described above in terms of a schematic diagram intended to be representative of a digital embodiment of the invention, it will be appreciated that analog or microprocessor embodiments and other forms of implementation may likewise be chosen. It is therefore intended that the following claims be interpreted as covering all such alternative embodiments and implementations as fall within the true spirit and scope of the invention.

We claim:

1. A complex ternary correlator for performing a correlation operation on a first complex input signal including a first real component signal and a first imaginary component signal and a second complex input signal including a second real component signal and a second imaginary component signal, and for developing complex correlation output signals comprising:

ternary operator means responsive to said first and second real and imaginary component signals and operative to develop ternary output signals terna, ternb, ternc and ternd, respectively;

ternary multiplier means responsive to crosspairs of said ternary output signals and operative to develop cross-product output signals (terna·ternc), (ternb·ternd), (ternb·ternc), and (terna·ternd), respectively;

means for subtracting said (ternb·ternd) signal from said (terna·ternc) signal to develop a third real component signal, and means for adding said (ternb·ternc) signal to said (terna·ternd) signal to develop a third imaginary component signal; and means for accumulating said third real and imaginary signals to develop complex correlation output signals.

2. A complex ternary correlator as recited in claim 1 wherein the complex input signals are digital signals having values that are greater than, equal to or less than zero, and wherein the output signals developed by said ternary operator means are digital signals having values of +1, 0 or −1.

3. A complex ternary correlator as recited in claims 1 or 2 wherein said ternary operator means includes four identical operator circuits each of which are responsive to a different one of said component signals.

4. A complex ternary correlator as recited in claim 3 wherein said cross product output signals developed by said ternary multiplier means are digital signals having values of +1, 0, or −1.

5. In an equalizer device including an adder means for adding a correction signal c(t) to a channel distorted signal x(t) to develop an equalized signal y(t), detection means for comparing said equalized signal y(t) to a predetermined constellation of signals and for outputting in complex form the constellation signal z(t) closest to said equalized signal y(t) and for developing a complex pseudo-error signal e(t) proportional to the difference between y(t) and z(t), conjugating means for developing a complex conjugate signal z*(t) corresponding to z(t), correlator means for correlating said error signal e(t) and said conjugate signal z*(t) to develop complex tap update signals $a_i(t)$ for adjusting the tap coefficients of said equalizer device, an improved correlator means, comprising:

means for converting said complex pseudo-error signal e(t) into a real first component signal and a first imaginary component signal and for converting said complex conjugate signal z*(t) into a second real component signal and a second imaginary component signal;

ternary operator means responsive to said first and second real and imaginary signals and operative to develop ternary output signals terna, ternb, ternc and ternd, respectively;

ternary multiplier means responsive to cross-pairs of said ternary output signals and operative to develop cross product output signals (terna·ternc), (ternb·ternd), (ternb·ternc), and (terna·ternd), respectively;

means for subtracting said (ternb·ternd) signal from said (terna·ternc) signal to develop a third real component signal, and means for adding said (ternb·ternc) signal to said (terna·ternd) signal to develop a third imaginary component signal; and accumulator means for combining said real and imaginary signals to develop the complex tap update signals.

6. In an equalizer device as recited in claim 5 wherein the first and second component signals are digital signals having values that are greater than, less than or equal to 0, and wherein the output signals developed by said ternary operator means are digital signals having values of +1, 0 or −1.

7. In an equalizer device as recited in claims 5 or 6 wherein said cross product output signals developed by said ternary multiplier means are digital signals having values of +1, 0, or −1.

8. In an equalizer device as recited in claim 7 wherein said ternary operator means includes four identical operator circuits, each of which is responsive to a different one of said component signals.

9. A method of correlating a first complex input signal including a first real component signal and a first imaginary component signal, and a second complex input signal including a second real component signal and a second imaginary component signal to develop a complex correlation signal comprising:

determining whether each of said real and imaginary component signals is greater than, equal to, or less than zero and developing a corresponding ternary signal equal to +1, 0 or −1 for each said component signal;

multiplying cross-pairs of said ternary signals to develop cross product signals (terna·ternc), (ternb·ternd), (ternb·ternc), and (terna·ternd), respectively;

subtracting said (ternb·ternd) signal from said (terna·ternc) signal to develop a third real component signal;

adding said (ternb·ternc) signal to said (terna·ternd) signal to develop a third imaginary component signal; and accumulating said third real and third imaginary signals to develop complex correlation output signals.

10. A method as recited in claim 9 wherein said cross product output signals have values of +1, 0, or −1.

* * * * *